W. ADAMSON.
Refining Oil.
No. 45,007. Patented Nov. 15, 1864.
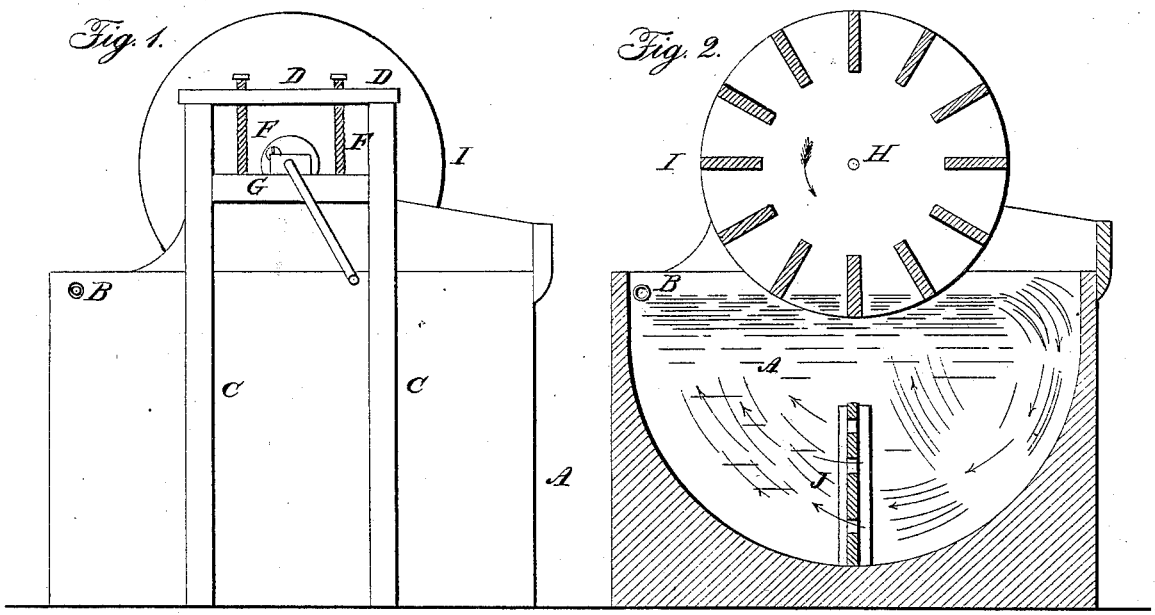
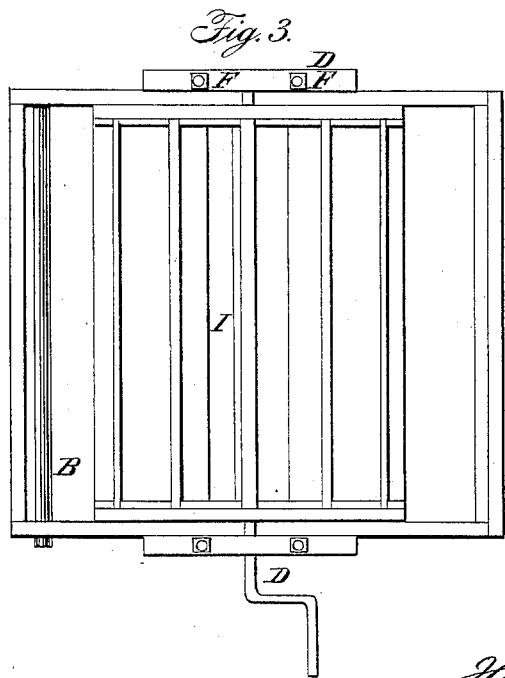
Witnesses:
Inventor:

UNITED STATES PATENT OFFICE.

WILLIAM ADAMSON, OF PHILADELPHIA, PENNSYLVANIA.

IMPROVED APPARATUS FOR PURIFYING MINERAL OILS.

Specification forming part of Letters Patent No. 45,007, dated November 15, 1864.

*To all whom it may concern:*

Be it known that I, WILLIAM ADAMSON, of Philadelphia, Pennsylvania, have invented an Improved Mode of Purifying Mineral Oils; and I do hereby declare the following to be a full, clear, and exact description of the same, reference being had to the accompanying drawings, and to the letters of reference marked thereon.

My invention consists in purifying mineral oils by mixing the same with suitable acids or alkalies, and washing the mixture with water in a tank or reservoir by means of a paddle-wheel operating on the contents of the tank in the manner described hereinafter.

In order to enable others to practice my invention, I will now proceed to describe the manner of carrying it into effect.

The accompanying drawings illustrate apparatus for carrying out my invention, Figure 1 being a side view of the apparatus; Fig. 2, a sectional elevation, and Fig. 3 a plan view.

Similar letters refer to similar parts in all the views.

A is a reservoir or tank, which I prefer to make concave at the bottom, as shown in the drawings, and across one side, near the top of the tank, extends a perforated leaden tube, B.

At each side of the tank A are two uprights, C C, connected at the top by a cross-piece, D, and through each cross-piece pass two elevating-screws, F F, to the lower ends of which is attached a movable cross-bar, G, which is guided by the uprights.

In suitable bearings secured to the cross-pieces G turns a shaft, H, and on this shaft is a paddle-wheel, I, the latter extending across the tank, and being arranged to turn freely within the same.

Across the bottom of the tank, directly below the paddle-wheel I, extends a perforated board, J, which can be removed at pleasure.

In purifying mineral oils it has been the practice to mix with them certain acids or akalies, which, after neutralizing the foreign substances in the oil, are removed by washing the latter with water. Considerable difficulty has, however, been experienced in producing such a thorough admixture of the water with the oil as to entirely remove the acid, the presence of which, especially in lubricating-oils, has been a source of much injury to machinery.

In using the above-described apparatus I deposit the oil to be purified in the tank, the paddle-wheel being so adjusted vertically that the floats will dip to the extent of about two-thirds of their depth into the oil. The wheel is then caused to revolve at the rate of about ten revolutions per minute in the direction of the arrow, after which the acid or alkali is permitted to flow into the pipe B, and through the perforations of the same into the tank, the acid or alkali being thus sprinkled over and onto the surface of the oil. As the wheel revolves, the oil, with the acid or alkali, is driven in the first instance toward the back of the tank, and then takes a course downward in the direction of the arrows, and again rises in front of the wheel. A thorough circulation, admixture, and agitation of the acid and oil takes place, the foreign particles in the oil uniting with and being neutralized by the acid. When this has been effectively accomplished, I introduce water into the tank, while the wheel is still in motion, the paddle-wheel being raised from time to time as the fluid in the tank is increased in depth. The tendency of the water is to separate from the oil and to sink to the bottom of the tank; but the oil, being agitated and taking the course already pointed out, necessarily passes through the water near the bottom of the tank. In being thus forced through the water the oil is separated into globules, and in this condition rises with the water to the surface, the water and oil being again impelled by the wheel in the direction pointed out by the arrows. After the acids or alkalies have united with the water and impurities of the oil, the wheel is stopped and the contents of the tank permitted to remain in a quiescent state until the impurities, with the mixed alkali or acid and water, settle to the bottom of the tank, the purified oil, which is on the top, being removed by siphons or otherwise, and the impurities being withdrawn and the tank cleansed preparatory to a repetition of the above-described process on a new supply of uncleansed oil. The contents of the tank taking the course of the arrows are partly arrested by the board J, through the perforations in which the oil, alkali, or acid and water will pass and become still more intimately mixed. This board, however, is not indispensable, as without it a very thorough admixture of the contents of the tank and purifying of the oil is effected.

I claim as my invention and desire to secure by Letters Patent—

The mode herein described of purifying mineral oils—that is to say, mixing the oil with acids or alkalies, and washing the mixture with water in a tank or reservoir by means of a paddle-wheel acting on the contents of the tank in the manner described.

In testimony whereof I have signed my name to this specification in the presence of two subscribing witnesses.

WM. ADAMSON.

Witnesses:
 CHARLES E. FOSTER,
 JOHN WHITE.